United States Patent Office 3,293,444
Patented Dec. 20, 1966

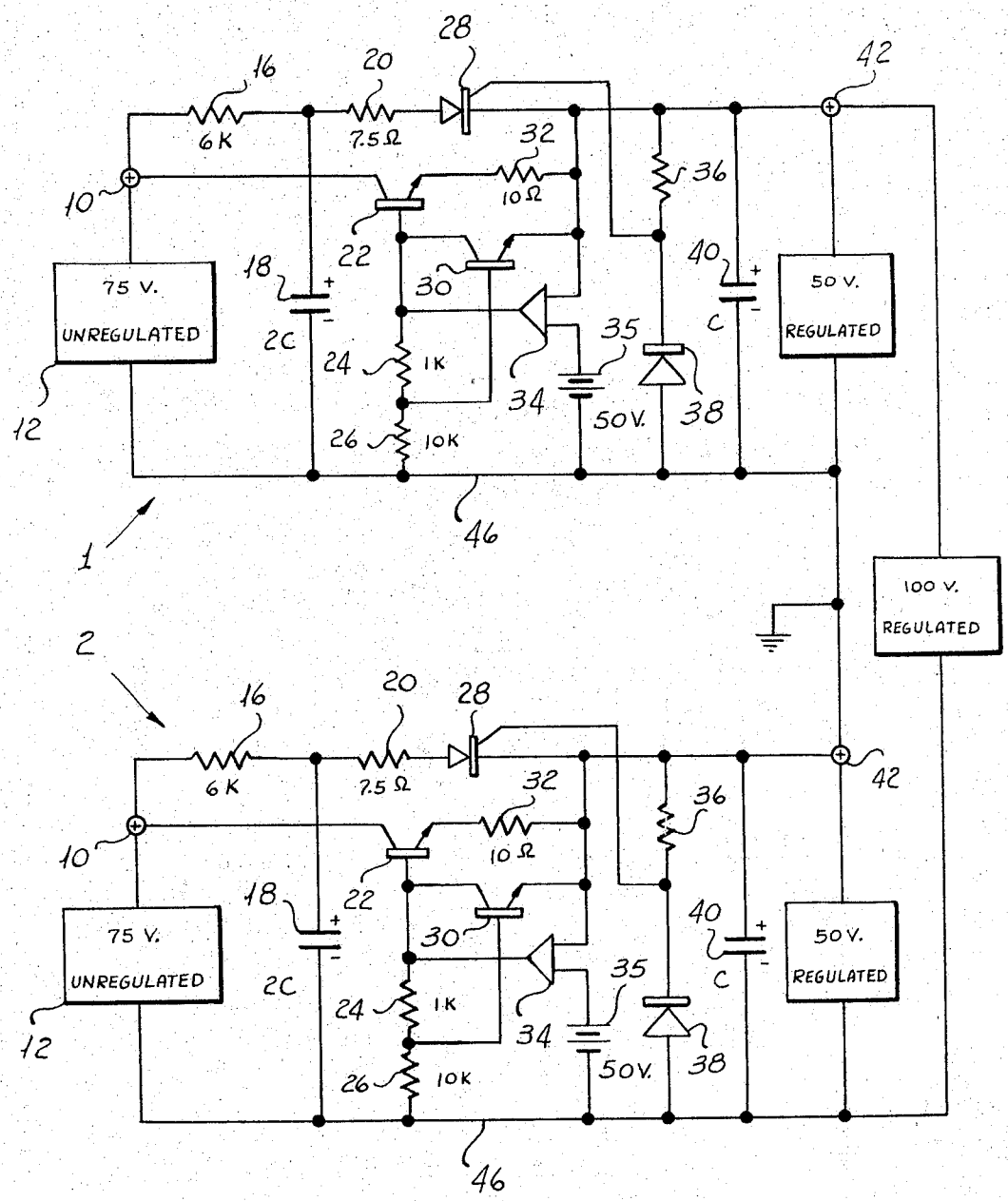

3,293,444
BUILD-UP CIRCUIT FOR SERIES-CONNECTED
POWER SUPPLIES
Aram H. Hagopian, New York, N.Y., assignor to United Aircraft Corporation, East Hartford, Conn., a corporation of Delaware
Filed Sept. 5, 1962, Ser. No. 221,499
9 Claims. (Cl. 307—66)

My invention relates to a build-up circuit for power supplies and more particularly to a build-up circuit for series-connected power supplies.

In a regulated power supply as shown in the copending application of Karl L. Burfeindt, Serial No. 52,094, filed August 26, 1960, now Patent No. 3,219,911, the output current is made dependent upon output voltage, rated current being permitted for rated voltage and reduced currents being permitted for voltages less than rated value. While this relationship of output current and output voltage prevents overheating the series regulating transistor, yet a problem arises where two or more power supplies having protection circuits with such characteristics are connected in series. Assume one supply provides rated output voltage, and a second series-connected supply provides zero output voltage. Because of the overload characteristic of these power supplies, the second supply can provide only a minimal flow of cut-off current. If the load current flowing through the series-connected supplies exceeds this cut-off current, then the output of the second supply will reverse polarity and never build up with its proper polarity.

One object of my invention is to provide a circuit for series-connected power supplies which causes a supply to build up with proper polarity.

A further object of my invention is to provide a circuit for series-connected power supplies which causes a supply to build up to rated voltage.

Other and further objects of my invention will appear for the following description.

In general my invention contemplates the provision of two series-connected power supplies. As previously pointed out, the series-connection of two supplies causes an inherent instability upon overload. When one supply breaks down, it will reverse polarity. I sense this reversal of polarity and momentarily connect an auxiliary source of voltage upon the output of such supply. The source should have sufficient capacity to produce rated output voltage. Once rated output voltage is established, such supply will carry the load and the auxiliary source may be disconnected without adverse effect.

The accompanying drawing, which forms part of the instant specification and is to be read in conjunction therewith, is a schematic view of my build-up circuit.

Referring more particularly now to the drawing, I provide two power supplies indicated generally by the reference numerals 1 and 2. The following description is equally applicable to both supplies 1 and 2 since they are shown as the same for purposes of convenience in description. It will be understood that the invention is not to be limited to series-connected power supplies of equal voltage. A source of 75 volts unregulated input voltage 12 is connected between a negative line 46 and a positive input terminal 10. Terminal 10 is connected to the collector of a series regulating transistor 22. The emitter of transistor 22 is connected through a 10 ohm resistor 32 to a positive output terminal 42, which is connected to line 46 through an appropriately polarized electrolytic filter capacitor 40 having a value C. A regulated output of 50 volts appears between terminal 42 and line 46. The base of transistor 22 is connected to ground through a voltage divider comprising a resistor 24 having a value of 1 kilohm and a resistor 26 having a value of 10 kilohms. The junction of resistors 24 and 26 is connected to the base of an overload transistor 30.

The collector of transistor 30 is connected to the base of transistor 22. The emitter of transistor 30 is connected to output terminal 42. The negative terminal of a 50 volt reference battery 35 is grounded. The positive terminal of reference battery 35 is connected to the reference input of a differential amplifier 34. The control input of differential amplifier 34 is connected to output terminal 42. The output of differential amplifier 34 is connected to the base of transistor 22. The gate of a silicon, controlled rectifier 28 is connected to output terminal 42 through a resistor 36. The anode of a diode 38 is connected to negative line 46. The cathode of diode 38 is connected to the gate of controlled rectifier 28. The anode of controlled rectifier 28 is connected to input terminal 10 through a 7.5 ohm discharging resistor 20 and a 6 kilohm charging resistor 16 in series. The junction of resistors 16 and 20 is connected to negative line 46 through an appropriately polarized electrolytic storage capacitor 18 having a value 2C.

Positive output terminal 42 of power supply 2 is connected to negative line 46 of power supply 1 and to ground. As in any three-wire system, loads may be connected between either of the positive and negative lines and ground or between lines.

In the region of regulation, differential amplifier 34 drives transistor 22 to maintain terminal 42 and 50 volts. In the overload region transistor 30 maintains equal voltages across resistors 24 and 32. Since the voltage across resistor 32 is proportional to output current and the voltage across resistor 24 is proportional to output voltage, overload transistor 30 maintains output current proportional to output voltage. Neglecting any voltage drop between the base and emitter of transistor 22, the values for resistors 24, 26, and 32 yield a rated current of 0.5 ampere for a rated voltage of 50 volts. A more detailed description appears in the aforementioned copending application.

When the output of supply 1 is of normal polarity, diode 38 blocks a flow of current through resistor 36. Hence no voltage appears across resistor 36; and no potential is impressed on the gate of controlled rectifier 28.

In operation of my invention, assume power supply 1 is short-circuited. Thus its output voltage is zero. As pointed out hereinbefore and in the copending application the output is reduced to the minimal cut-off current of transistor 22. However, a line-to-line load connected between terminal 42 of supply 1 and line 46 of supply 2 will draw current, since supply 2 is operating at rated voltage. Upon removal of the short-circuit of supply 1, its output voltage remains zero, since capacitor 40 cannot be charged instantaneously. If the current drawn by such line-to-line load exceeds the cut-off current of supply 1, then the net current flow through capacitor 40 will be opposite to its proper charging current, and terminal 42 will be driven negative relative to line 46. This reversed polarity voltage is impressed by diode 38 upon the gate of controlled rectifier 28. Rectifier 28 then fires, permitting the discharge of storage capacitor 18 to charge capacitor 40. Controlled rectifier 28 then cuts off since resistor 16 limits the current flow to less than the holding current. When controlled rectifier 28 is rendered non-conductive, resistor 16 causes storage capacitor 18 to recharge to 75 volts.

Suppose controlled rectifier 28 has a peak current rating of 10 amperes and a holding current of 25 milliamperes. Resistor 16 causes storage capacitor 18 to charge to 75 volts. Since terminal 42 is only slightly negative when controlled rectifier 28 fires, substantially 75 volts appears across resistor 20. Thus a value of 7.5 ohms will limit the current flow to 10 amperes which is the peak rating of the controlled rectifier. It is desired that the transient current be as large as possible so that rated output is quickly attained. This reduces the required value of storage capacitor 18 to the minimum value shown. It is further desired that the current flow be large compared with the rated power supply current. When rated output voltage is attained, capacitor 18 discharges from 75 to 50 volts; and capacitor 40 charges from substantially 0 to 50 volts. Since the change in voltage of capacitor 40 is twice that of capacitor 18 for the same charge transferred, the value of capacitor 18 must be twice that of capacitor 40, assuming an instantaneous charge transfer. Thus if capacitor 40 has a value of C, capacitor 18 must have a value of at least 2C. At the end of the transient period both capacitors 18 and 40 sustain 50 volts; and the only source of current for controlled rectifier 28 is through resistor 16. In order to insure that controlled rectifier 28 assumes a non-conductive condition, I reduce the current to 12.5 milliamperes which is half the minimum holding current. Since the normal voltage drop across resistor 16 at the end of the transient period is 25 volts, a 2 kilohm resistance value would be adequate. However, if a short were subsequently imposed on supply 1 during the transient period while controlled rectifier 28 was conductive, then both capacitors 18 and 40 would discharge to ground potential and 75 volts would appear across resistor 16. In such event, controlled rectifier 28 would never cut off, capacitor 18 would never recharge, and the entire build-up circuit would be rendered inoperative. To obviate this contingency, I provide resistor 16 with a value of 6 kilohms, so that even with a drop of 75 volts it passes only 12.5 milliamperes. Thus controlled rectifier cuts off, capacitor 18 recharges to 75 volts, and the circuit is restored to an operative condition.

As will be appreciated by those skilled in the art, I may alternatively connect storage capacitor 18 in parallel with resistor 16. For this alternate placement of the storage capacitor it is desirable that source 12 have a low impedance, preferably not greater than 7.5 ohms. Then resistor 20 could be eliminated since its equivalent would be incorporated into the output impedance of source 12. It will be appreciated that the shunt placement of the storage capacitor 18 shown introduces no limitations on the output impedance of source 12.

It will be appreciated by those having ordinary skill in the art, that the foregoing description assumes the break-down by short-circuiting of series-connected supplies which had previously built up to rated voltage. However, a similar condition arises where the supplies are initially energized with an appreciable line-to-line load or where both supplies have been short-circuited.

It will be seen that I have accomplished the objects of my invention. My build-up circuit for series-connected power supplies forces a supply to build up with the proper polarity to rated output voltage upon the termination of an overloaded condition.

It will be understood that certain features and subcombinations are of utility and may be employed without reference to other features and subcombinations. This is contemplated by and is within the scope of my claims.

It is further obvious that various changes may be made in detail within the scope of my claims without departing from the spirit of my invention. It is, therefore, to be understood that my invention is not to be limited to the specific details shown and described.

Having thus described my invention, what I claim is:

1. A power supply system including in combination a regulated power supply providing an output, an auxiliary source of electrical power, and means responsive to the removal of an overload from the supply for momentarily coupling the source to said output.

2. A power supply system including in combination a regulated power supply providing an output of predetermined polarity, an auxiliary source of power, and means responsive to a reversed polarity output of the supply for momentarily coupling the source to said output.

3. A power supply build-up circuit including in combination a regulated power supply having an input source and providing an output, a capacitor, a switching device, means coupling the source to the capacitor, means including the device for coupling the capacitor to the output of the supply, and means responsive to the removal of an overload from the supply for actuating the switching device.

4. A power supply build-up circuit including in combination a regulated power supply having an input voltage source of nominal magnitude V and normally providing an output voltage of a lesser magnitude $v$, the power supply including an output capacitor of capacitance value C, a storage capacitor, a switching device, means coupling the source to the storage capacitor, means including the device for coupling the storage capacitor to the output of the supply, and means responsive to the removal of an overload from the supply for actuating the switching device, the storage capacitor having a capacitance value which is not appreciably less than $vC/V-v$.

5. A build-up circuit for series-connected power supplies including in combination a first and a second regulated power supply each providing an output, means connecting said outputs in series, an auxiliary source of power, and means responsive to the removal of an overload from the first supply for momentarily coupling the source to said first output.

6. A build-up circuit for series-connected power supplies including in combination a first and a second regulated power supply each providing an output of predetermined polarity, means connecting said outputs in series-aiding relationship, an auxiliary source of power, and means responsive to a reversed polarity output of the first supply for momentarily coupling the source to said first output.

7. A build-up circuit for series-connected power supplies including in combination a first and a second regulated power supply each providing an output of predetermined polarity, means connecting said outputs in series-aiding relationship, a first and a second auxiliary source of power, means responsive to a reversed polarity output of the first supply for momentarily coupling the first source to said first output, and means responsive to a reversed polarity output of the second supply for momentarily coupling the second source to said second output.

8. A power supply build-up circuit including in combination a regulated power supply having an input source and providing an output of predetermined polarity, a capacitor, a switching device, means coupling the source to the capacitor, means including the device for coupling the capacitor to the output of the supply, and means responsive to a reversal in polarity of said output for actuating the switching device.

9. A power supply build-up circuit including in combination a regulated power supply having an input voltage source of nominal magnitude E and normally providing an output voltage of a predetermined polarity and of a lesser magnitude $v$, the power supply including an output capacitor of capacitance value C, a storage capacitor, a switching device, means coupling the source to the storage capacitor, means including the device for coupling the storage capacitor to the output of the supply, and means responsive to a reversal in polarity of said output for actuating the switching device, the storage capacitor having a capacitance value which is not appreciably less than $vC/E-v$.

References Cited by the Examiner

UNITED STATES PATENTS

| | | | |
|---|---|---|---|
| 2,693,568 | 11/1954 | Chase | 321—18 |
| 3,040,239 | 6/1962 | Walker | 323—24 |
| 3,049,642 | 8/1962 | Quinn | 315—219 X |
| 3,080,516 | 3/1963 | Bixby | 323—22 |
| 3,161,778 | 12/1964 | Harrison | 307—61 |
| 3,213,287 | 10/1965 | King | 307—71 |

FOREIGN PATENTS 898,281   6/1962   Great Britain.

JOHN F. COUCH, *Primary Examiner.*

LLOYD McCOLLUM, *Examiner.*

D. L. RAE, K. D. MOORE, *Assistant Examiners.*